BEST AVAILABLE COPY

F. E. HOFFMANN.

Circular Brick Kiln.

No. 3,237.

Reissued Dec. 22, 1868.

Witnesses:
Wm Haupt
J. M. Compton
Ric Fuller

Inventor:
F. E. Hoffmann
per
L. S. Dethlefs
Attorney

N. PETERS, Photo-Lithographer, Washington, D.C.

BEST AVAILABLE COPY

United States Patent Office.

FRIEDRICH EDWARD HOFFMANN, OF BERLIN, PRUSSIA.

*Letters Patent No. 48,244, dated June 13, 1865; reissue No. 3,237, dated December 22, 1868.*

IMPROVED CIRCULAR KILN.

The Schedule referred to in these Letters Patent and making part of the same.

*To all whom it may concern:*

Be it known that I, FRIEDRICH EDWARD HOFFMANN, of Berlin, in the Kingdom of Prussia, have invented a new and improved Kiln for Burning Bricks and other materials; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 1:
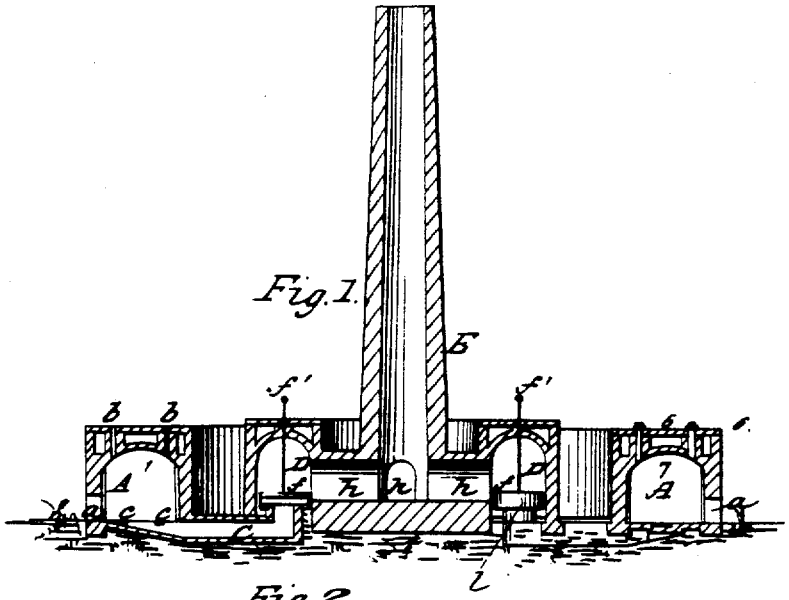
Figure 1 represents a vertical central section of this invention, the line *x–x*, fig. 2, indicating the plane of section.
Figure 2:
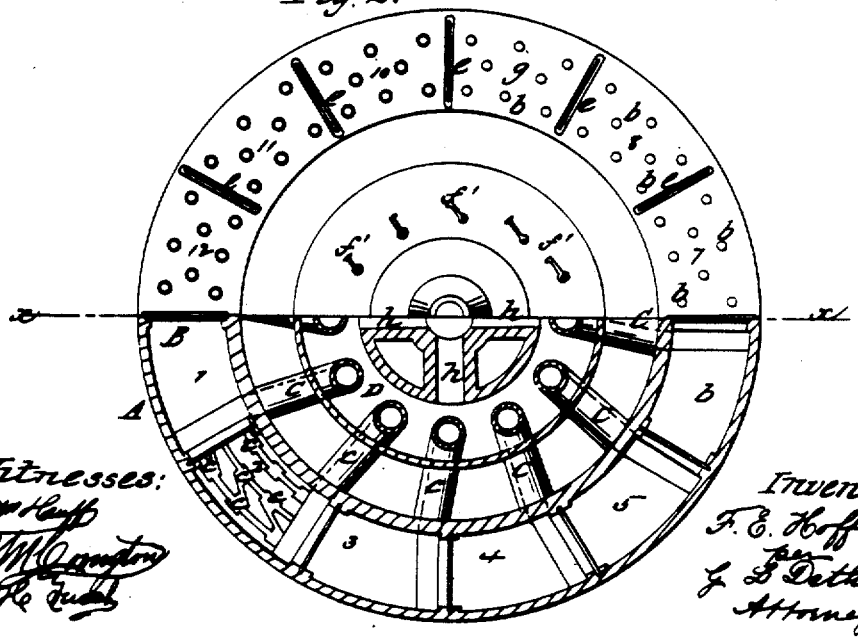
Figure 2 is a plan or top view of the same, partly in section.

This invention relates to a kiln or oven, which is provided with an endless or continuous channel or gallery, divided into a series of distinct sections, into which the material to be burned is introduced.

The fuel used in the kiln is dropped down through apertures in the top of the channel or gallery.

Each section communicates with a smoke-chamber, and through this chamber with a smoke-stack, suitable slides or movable partitions being provided, in such a manner that bricks or other materials introduced into the several sections of the kiln can be gradually heated and cooled, and the operation of the kiln can be continued for any length of time, with great economy in fuel.

A represents an endless or continuous channel or gallery, which may be of a circular shape, as shown in the drawing, or of any other desired form, for instance, elliptic, square, &c.

This continuous channel or gallery is divided into twelve (more or less) sections, 1 to 12.

Each section is provided with a door, *a*, through which the bricks or other material to be burned or heated can be introduced and removed, and with a series of apertures, *b*, in the top of the channel, through which fuel is introduced.

In order to cause said fuel to arrange itself properly on the bottom of each section, said bottoms are provided with cavities, *c*, situated opposite the openings in the top, as shown in fig. 1 of the drawing.

The several sections can be separated, one from the other, by a movable partition, B, which is introduced through suitable slots, *d*, and those slots which are not occupied by the partition are covered up by movable covers, *e*.

Each section communicates, through a flue, C, with a smoke-chamber, D, and the inner ends of said flues turn up and are covered with dampers, *f*, which can be raised or lowered by means of rods, *f'*, extending above the upper surface of said smoke-chamber, or, instead of the dampers *f*, valves of any other description may be applied, which will serve to open and close the flues C.

Each of said flues can thus be readily opened and brought in communication with the smoke-chamber.

The smoke-chamber communicates, through exit-flues *h*, with the smoke-stack E.

The operation of this kiln, when used for burning brick, is as follows:

Suppose the kiln to be in full action and the movable partition B placed between sections 12 and 1; then the doors *a*, of sections 1 and 2, are open; the damper or valve of the flue for section 12 is also open, while all other openings and valves of the kiln are closed. The sections 2, 3, 4, 5, and 6 contain material, (say bricks,) the burning of which has been finished. Section 7 contains the fire, and sections 8, 9, 10, 11, and 12 are filled with bricks yet to be burned. The doors of sections 1 and 2 are opened to fill section 1 with fresh bricks, and to empty section 2 of its contents already burned and cooled.

Through the doors *a* of sections 1 and 2, a current of atmospheric air enters into the burning-channel or gallery, and passes through the sections 3, 4, 5, and 6, where it is gradually heated. Meanwhile the bricks contained in these sections are gradually cooled.

In section 7, fuel of any kind, such as wood, coal, coal-dust, &c., is introduced through the openings, *b*, in the top of the gallery. The fuel drops into interstices between the bricks, and is instantly ignited by the contact with the hot atmospheric air.

The gaseous products of the combustion now pass through the sections 8, 9, 10, 11, and 12, gradually heating the bricks contained in these sections, until they leave the burning-channel or gallery through the flue emanating from section 12, whence they enter the smoke-chamber D, and finally escape through the exit-flues into the smoke-stack.

After the burning of the material in section 7 is finished, and section 1 is filled with green bricks, the door of section 1 is closed, the partition B is placed between sections 1 and 2, the valve of the flue of section 12 is closed, and that of section 1 is opened, and fuel is now introduced into section 8, and the operation is the same as before, and so on, from one section to the other.

The operation of the kiln can thus be continued without interruption.

The air, which is introduced to support the combustion of the fuel, is heated by passing through the material previously burned in the kiln, and serves, at the same time, to cool said material, so that no fuel is wasted, and no time is lost in cooling off the kiln for the purpose of emptying and recharging it.

This kiln can be made in any desirable form or shape, as the plan of the burning-channel or gallery may be circular, elliptic, square, &c.

The kiln can be used with great advantage for burning bricks, tiles, limestone, pottery, chalk, gypsum, cement, and also for roasting ores, and for various metallurgical operations.

Having thus described my invention,

BEST AVAILABLE COPY

What I claim as new, and desire to secure by Letters Patent, is—

1. The continuous kiln or gallery A, made in sections 1, 2, 3, &c., the several sections having separate communication with the main smoke-flue D, in combination with the movable partition B, fitted to go between adjoining sections, substantially as and for the purpose described.

2. The combination of the continuous gallery A, composed of successive chambers or sections 1, 2, 3, &c., the flues C and dampers *f*, the main flue D, the movable partition B, and the fuel-supply apertures *b* in the top of the kiln, substantially as described and shown.

3. The cavities or depressions *c* in the bottoms of the kiln-chambers or sections 1, 2, 3, &c., in combination with the fuel-supply apertures *b*, substantially as described.

This specification signed by me, this 11th day of February, 1868.

FRIEDRICH EDWARD HOFFMANN.

Witnesses:

H. BREISMANN,
THEOD. REUTER, C. E.,
*7 Kessel Street, Berlin.*